(12) United States Patent
Mariller

(10) Patent No.: US 7,464,636 B2
(45) Date of Patent: Dec. 16, 2008

(54) DEVICE FOR THE PREPARATION OF A COFFEE-BASED DRINK

(75) Inventor: Alain Mariller, Belmont (CH)

(73) Assignee: Jean-Paul Gaillard, Cully (CH)

( * ) Notice: Subject to any disclaimer, the term of this patent is extended or adjusted under 35 U.S.C. 154(b) by 273 days.

(21) Appl. No.: 10/566,973

(22) PCT Filed: Aug. 3, 2004

(86) PCT No.: PCT/CH2004/000484

§ 371 (c)(1),
(2), (4) Date: Feb. 27, 2006

(87) PCT Pub. No.: WO2005/011452

PCT Pub. Date: Feb. 10, 2005

(65) Prior Publication Data

US 2006/0196362 A1   Sep. 7, 2006

(30) Foreign Application Priority Data

Aug. 5, 2003   (CH) .................................... 1353/03

(51) Int. Cl.
*A47J 31/00* (2006.01)
(52) U.S. Cl. ...................... 99/295; 99/289 R; 99/289 P; 99/302 R
(58) Field of Classification Search ............... 99/495, 99/452, 275–277, 348, 279–307, 323
See application file for complete search history.

(56) References Cited

U.S. PATENT DOCUMENTS 6,182,554 B1   2/2001   Beaulieu (Continued)

FOREIGN PATENT DOCUMENTS

EP   1 247 480   10/2002

(Continued)

OTHER PUBLICATIONS

International Search Report.

*Primary Examiner*—Timothy F. Simone
(74) *Attorney, Agent, or Firm*—Nixon & Vanderhye, P.C.

(57) ABSTRACT

The invention relates to a device for the preparation of a coffee-based drink by extracting a dose of ground coffee contained in a capsule (8). Said device comprises a water reservoir (1), a pump (2), a heating body (15) and a water injection element (9) which are successively linked by means of a water supply line(3). The device also comprises the following items disposed in the extension of the water injection element (9): a capsule holder (7) and an outlet (10) for the water-coffee mixture. The capsule holder (7) is adapted in such a way that it can be fixed and manually removed from the device and comprises means for containing a coffee capsule (8) so that pressurized water from the water injection element (9) can flow through the capsule (8) and flow through the outlet (10). The inventive device is characterized in that it also comprises a derivation line (5) whereby one end thereof is connected to the water supply line (3) and comprises hydraulic means on the other end thereof, which are adapted in such a way that they can control the a coffee-water mixture discharged through the outlet (10). The inventive device also comprises a valve (4) which is disposed in such a way as to enable the discharge of water in the derivation line (5) when a predetermined pressure is obtained. The inventive device makes it possible for the user to define the pressure of the coffee-water mixture

7 Claims, 7 Drawing Sheets

U.S. PATENT DOCUMENTS 6,740,345 B2 * 5/2004 Cai .............................. 426/77
6,786,134 B2 * 9/2004 Green ...................... 99/289 P

FOREIGN PATENT DOCUMENTS

WO   WO 02/058523   8/2002

* cited by examiner

DEVICE FOR THE PREPARATION OF A COFFEE-BASED DRINK

This application is the US national phase of international application PCT/CH2004/000484 filed 3 Aug. 2004 which designated the U.S. and claims benefit of CH 01353/03, dated 5 August 2003, the entire content of which is hereby incorporated by reference.

FIELD OF THE INVENTION

The present invention lies in the field of devices for the preparation of coffee-based drinks by extracting a dose of ground coffee contained in a capsule.

DESCRIPTION OF THE PRIOR ART

Devices operating according to the aforementioned principle have existed for many decades.

Patents U.S. Pat. No. 2,899,886, U.S. Pat. No. 2,968,560, U.S. Pat. No. 3,403,617 and U.S. Pat. No. 3,607,297 describe devices in which the capsule is initially perforated in several places and then traversed by the pressurized water.

The capsule described in patent CH 605 293 or in patent EP 0 242 556 B1 comprises a membrane in its lower portion. Pressurized water is initially inserted into the upper portion of the capsule, which causes a swelling of the capsule, mainly at the membrane. At a certain pressure, the membrane tears, thereby allowing a water-coffee mixture to flow out.

In the device proposed in patent EP 0 512 470 B1, bulging following the introduction of water into the capsule, the membrane is squashed and perforated against a surface which comprises elements in relief.

Other devices using a mode of operation identical or similar to those previously described are proposed in the following patent documents: EP 0 250 810 B1, EP 0 521 188 B1, EP 0 521 397 B1, EP 0 726 053 B1, EP 0 469 162 B1 and WO 92/07775.

Also known are other devices in which the water-coffee mixture is first made in the chamber that contains the capsule, but flows out only when the pressure in the chamber containing the capsule has reached a minimum preset value. In particular see patent applications EP 0 726 053 A1, EP 0 622 039 A1 and EP 1 016 364 A2.

In all the abovementioned devices, the outflow of the water-coffee mixture is triggered at a determined pressure, preset during the manufacture of the device.

Patent application EP 1 247 480 A1 describes a system making it possible to control the pressure. It consists of a hydraulic circuit comprising a set of pipes, valves and chambers. Depending on the chosen pressure, some pipes are deactivated and others activated. Similarly, some chambers are emptied and others filled. These changes cause the opening or closing of the outflow orifices.

The dose of coffee is contained in a chamber that opens and recloses as a function of the hydraulic pressure existing in a specific chamber.

The circuit comprises several valves, one of which, being pressure-sensitive, operates so as to activate a sub-circuit for stopping the outflow of the water-coffee mixture when the water pressure in the circuit is too low and, when the pressure is adequate, so as to activate a sub-circuit for the outflow of the liquid water-coffee mixture.

The aforementioned device is relatively complex in its structure and its operation. Also, it is suitable for a specific type of coffee doses and is not intended for capsule-carriers that are manually attached to or removed from the device.

SUMMARY OF THE INVENTION

The present invention is aimed particularly at remedying the aforementioned problems.

Accordingly, it relates to a device for the preparation of a coffee-based drink by extracting a dose of ground coffee contained in a capsule, said device comprising a water tank, a pump, a heater body and a water injection member connected successively via a water inlet pipe; the device also comprising, disposed in the extension of the water injection member, a capsule-carrier and an outlet orifice for the water-coffee mixture; the capsule-carrier being suitable for being manually attached to and removed from the device and comprises means for containing a capsule of coffee, so that the pressurized water originating from the water injection member can pass through the capsule and pass through the outlet orifice, said device being characterized in that it also comprises a branch pipe, connected at one of its ends to the water inlet pipe, and comprising, at the other of its ends, hydraulic means suitable for controlling the outflow of a water-coffee mixture through the outlet orifice, the device also comprising a valve placed so as to allow the water to flow into the branch pipe when a predefined pressure is reached.

It should be noted that the device according to the invention has many differences and advantages relative to, the prior art. Patent application EP 1 247 480 A1, for example, comprises the following differences and disadvantages:

hydraulic closure of the chamber that retains the capsule,
complexity of the whole device (plurality of valves and water pipe lines, etc.),
placement and operation of the pressure-sensitive valve,
no capsule perforation members that can be moved relative to the capsule-carrier.

Preferably, the device comprises means that allow the user to choose the valve opening pressure, therefore to define the pressure for extracting the coffee from the capsule.

Advantageously, the valve is pressure-sensitive, for example mechanically, which considerably simplifies the device.

According to a variant of the invention, the hydraulic means comprise a stopper which alternatively closes off or releases the outflow of a water-coffee mixture through the outflow orifice.

The stopper may be situated anywhere between the capsule and the outflow orifice. According to one embodiment, it is situated below the capsule-carrier.

Quite evidently, the device may contain several stoppers if several orifices must be closed off.

Preferably, with this variant, use is made of perforating elements, for example teeth, that are placed on the capsule-carrier so that the capsule is perforated when it is inserted into the device.

According to another variant of the invention, the hydraulic means consist of at least one perforation member which, when it is activated, perforates a capsule placed on the capsule-carrier and thereby allows a water-coffee mixture to flow through the outflow orifice.

Advantageously, the device comprises several perforation members which move between a rest position (that is to say when there is no outflow of the water-coffee mixture), situated under or in the capsule-carrier, and an active position situated above the capsule-carrier. Thus the capsule initially rests on a flat surface. When the hydraulic means are activated, the perforation members emerge from the flat surface and pierce the capsule.

According to another variant of the invention, the device may be used with a capsule which already comprises orifices covered by a thin membrane. The capsule-carrier comprises a silicone membrane attached to a spring which initially closes off said orifices but which releases them following the application of a force that compresses the spring.

According to another variant of the invention, the capsule-carrier contains an outflow orifice with a relatively large diameter, the edges of the orifice comprising at least one leading element whose function consists in tearing the membrane of a bulging capsule. The outflow orifice is initially closed off by a piston and then is opened by the downward movement of the piston.

It goes without saying that the device according to the invention may be used with a very large number of different capsules, which in particular comprises a membrane which bulges or does not bulge following the introduction of water into the capsule.

Similarly, the device according to the invention, without its variant that comprises perforation members, may use capsules with rigid walls, that is to say with no flexible membrane.

It will also be noted that the capsules used may be of various shapes, for example conical, cylindrical or even cubic.

Some embodiments of the invention are described hereinafter by means of the following figures:

FIG. 1 presents schematically a first variant of the invention in rest mode.

FIG. 2 presents a variant of FIG. 1 in active mode.

FIG. 3 presents schematically a second variant of the invention in rest mode.

FIG. 4 presents a variant of FIG. 3 in active mode.

REFERENCE NUMBERS USED IN THE FIGURES

Figure 1:
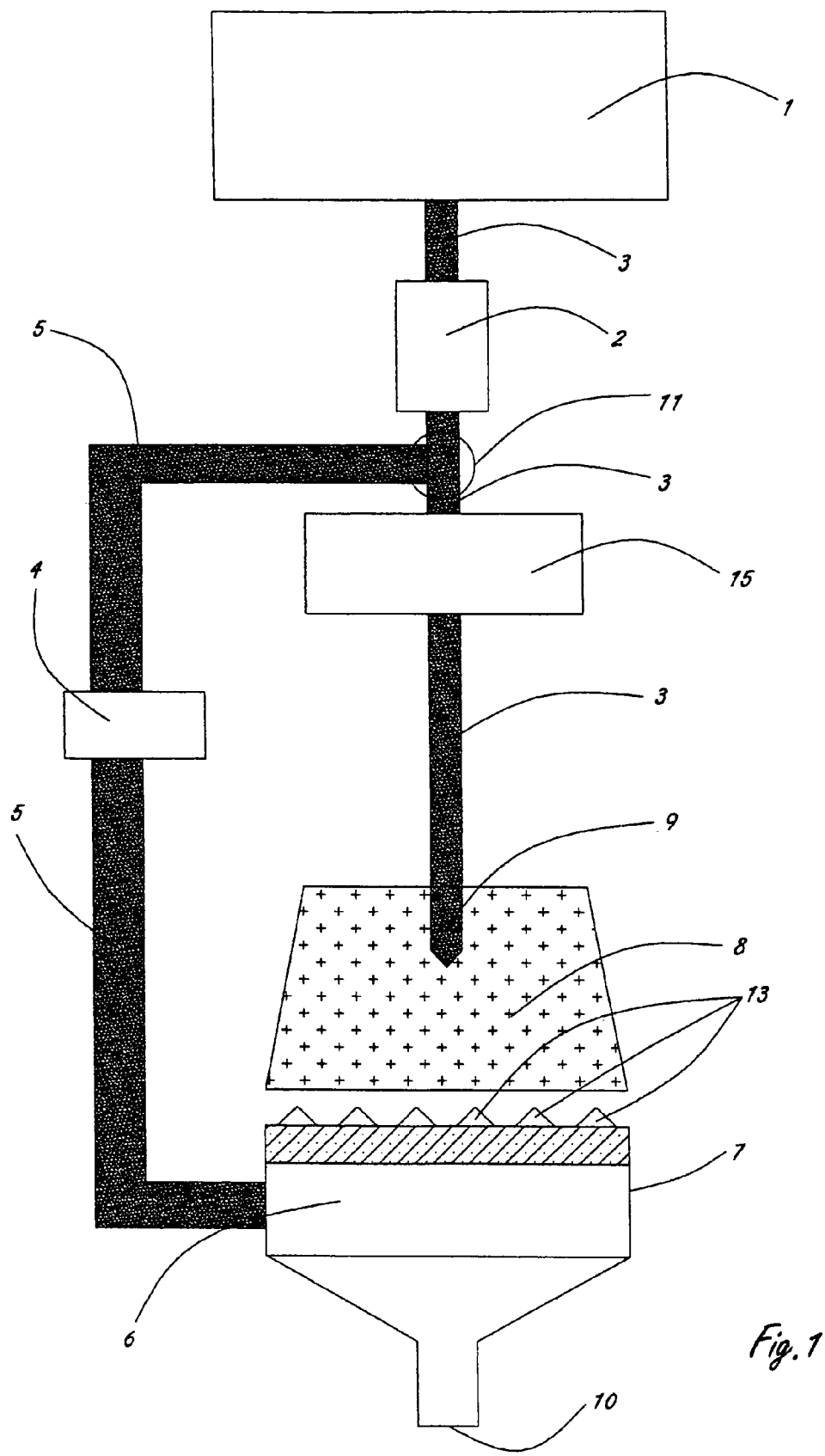

1. Tank
2. Pump
3. Water inlet pipe
4. Valve
5. Branch pipe
6. Hydraulic activation means
7. Capsule-carrier
8. Capsule
9. Water injection member
10. Outlet orifice
11. Y-connector
12. Stopper
13. Perforating element
14. Outflow orifice
15. Heater body
16. Valve inlet orifice
17. Valve outlet orifice
18. Closure zone
19. Spring
20. Flexible reservoir
21. Movable annular body
22. Fastening ring
23. Capsule support
24. Support plate for perforating elements
25. Stopper piston The device schematized in FIGS. 1 and 2 consists of a water inlet pipe 3 successively connecting a tank 1, a pump 2, a heater body 15 and a water injection member 9 having one end sufficiently sharp to perforate a capsule 8 placed on a capsule-carrier 7 in the extension of the water inlet pipe 3. The capsule-carrier 7 comprises in its lower portion an outlet orifice 10.

The upper portion of the capsule-carrier comprises perforating elements 13, that can be moved in a vertical direction. Once the bottom of the capsule 8 is pierced by the perforating elements 13, a water-coffee mixture may flow through the capsule-carrier 7 in order to be collected in a cup (not illustrated) placed beneath the outlet orifice 10.

The device also comprises a branch pipe 5 whose upper end is connected to the water inlet pipe 3, between the pump 2 and the heater body 15, by means of a Y-connector 11. The branch pipe 5 also comprises a valve 4 suitable for being opened at a preset pressure. Finally, the bottom end of the branch pipe 5 is connected to hydraulic activation means 6, for example a piston, which, when they are activated following the opening of the valve 4, operate the perforating elements 13 upward toward the capsule 8.

The device operates as follows: initially, the valve 4 is closed and the pump 2 deactivated. A new capsule 8 is placed on the capsule-carrier 7, followed by the piercing of its top wall by the injection member 9. Water is then introduced into the inlet pipe 3 by activation of the pump 2. See FIG. 1 which represents in black the portions of pipe occupied by water following the activation of the pump 2.

Figure 2:
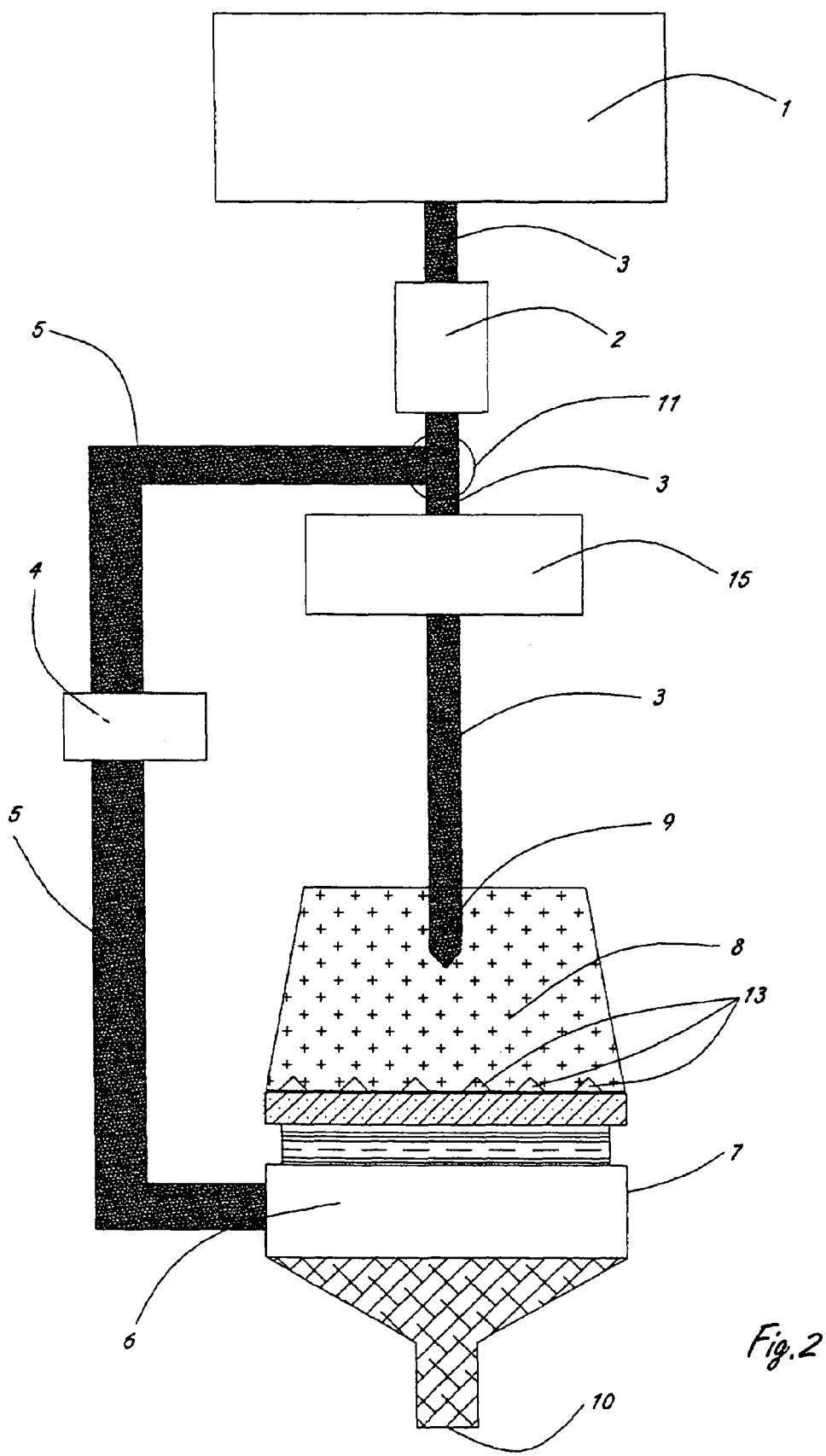

When the water that is in the water inlet pipe 3, hence in the capsule 8, has reached a preset pressure, the valve 4 opens so that the water flows into the rest of the branch pipe 2 and activates the perforating elements 13 which pierce the lower wall of the capsule 8 (see FIG. 2). The water-coffee mixture contained in the capsule 8 flows through the capsule-carrier 7, through orifices (not illustrated) and is collected in a cup placed beneath the outlet orifice 10.

It goes without saying that the diagrams illustrated in FIGS. 1 and 2 do not summarize all the embodiment possibilities of the invention. The capsule-carrier is not necessarily placed beneath the capsule. As an example, provision may be made for a capsule-carrier that holds the capsule from above. Similarly, the perforating elements may pierce the capsule laterally or from the top.

Figure 3:
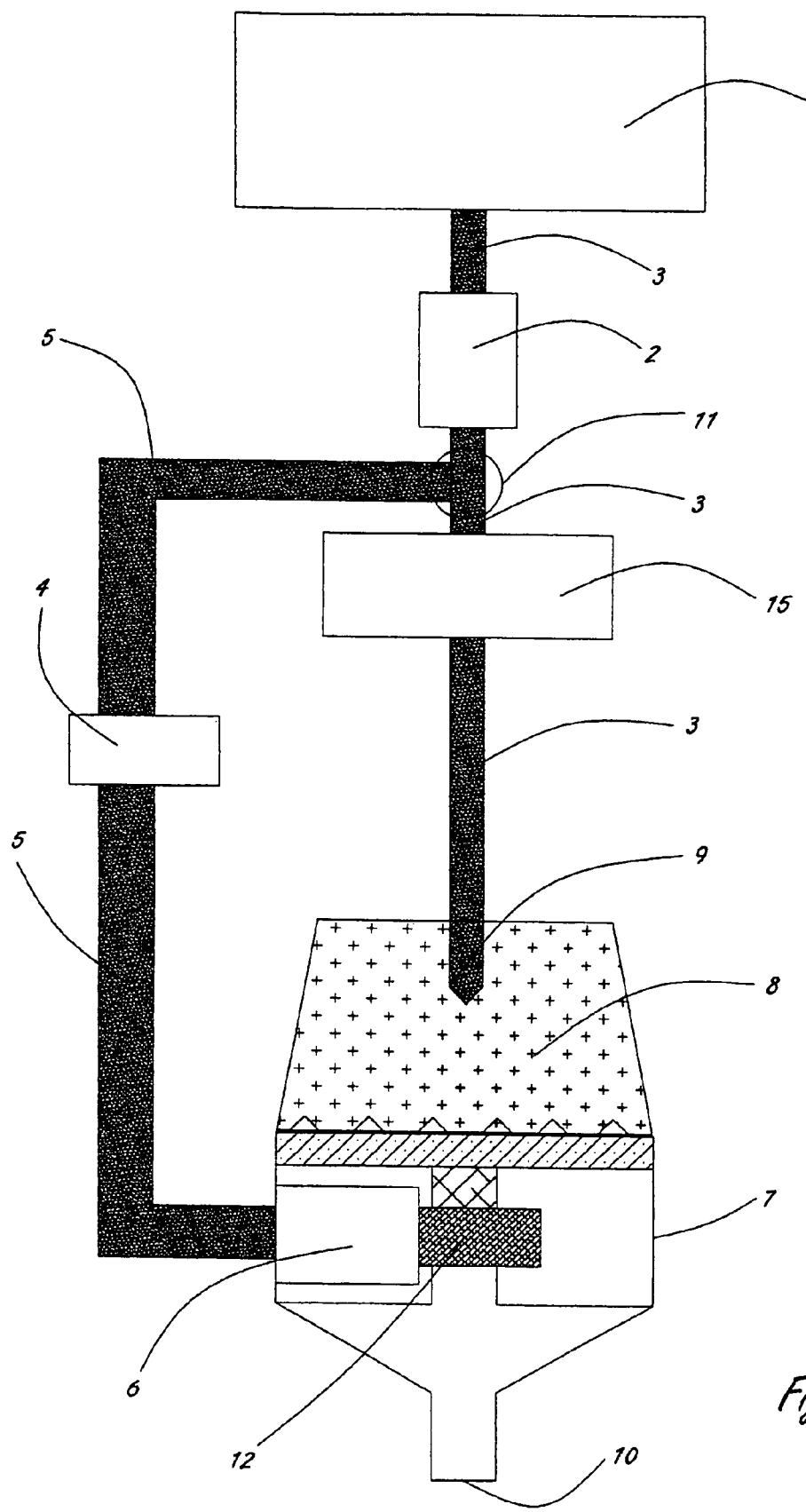
Figure 4:
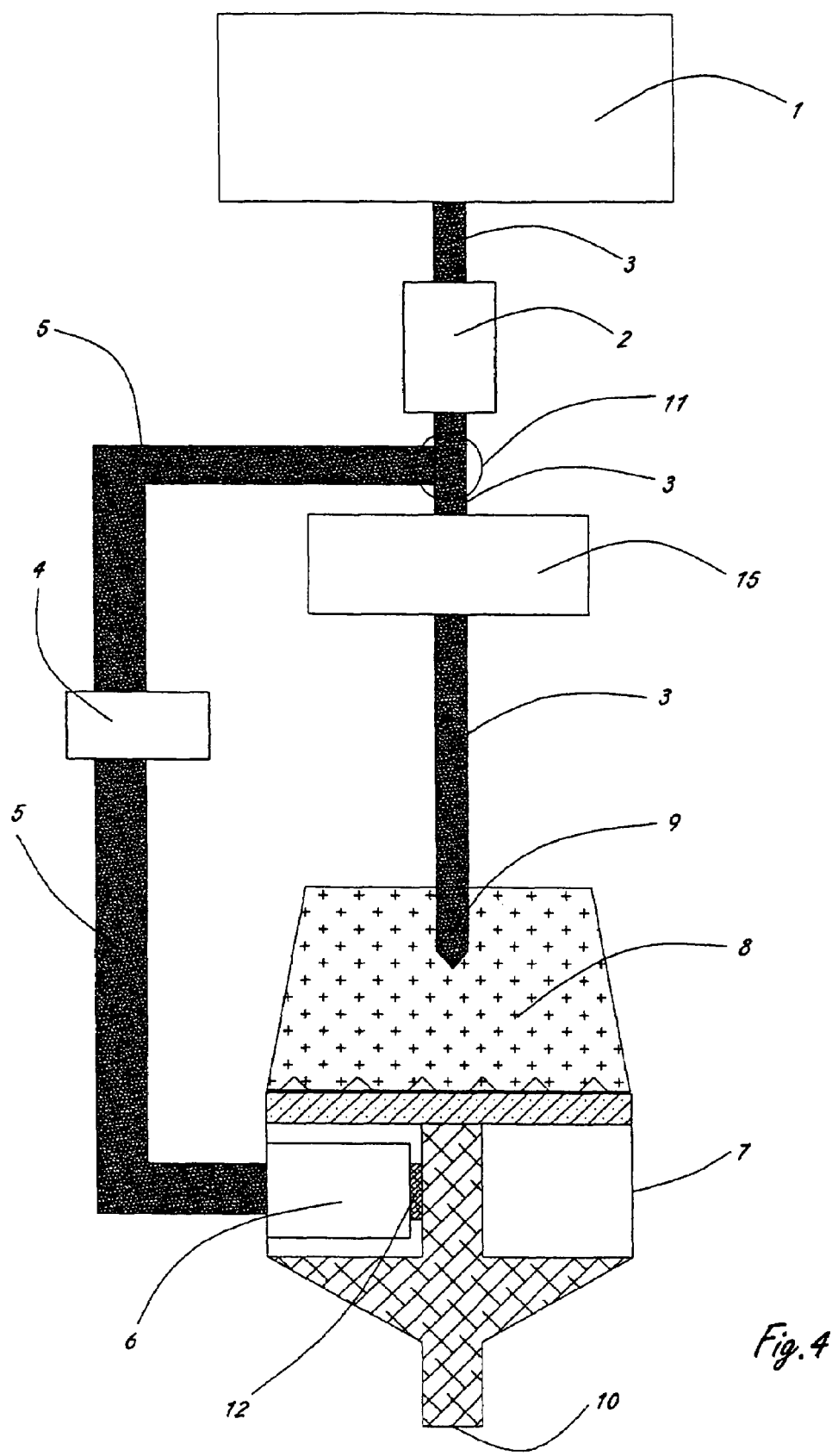

The variant illustrated in FIGS. 3 and 4 differs from that of FIGS. 1 and 2 only by the fact that the perforating elements are replaced by one (or several) stopper 12 which, when it is inactive, closes off the outlet pipe and, when it is active, releases it. It will be noted that, in this variant, the bottom wall of the capsule 8 is pierced when it is placed in the capsule-carrier 7, before the water arrives in the capsule.

Figure 5:
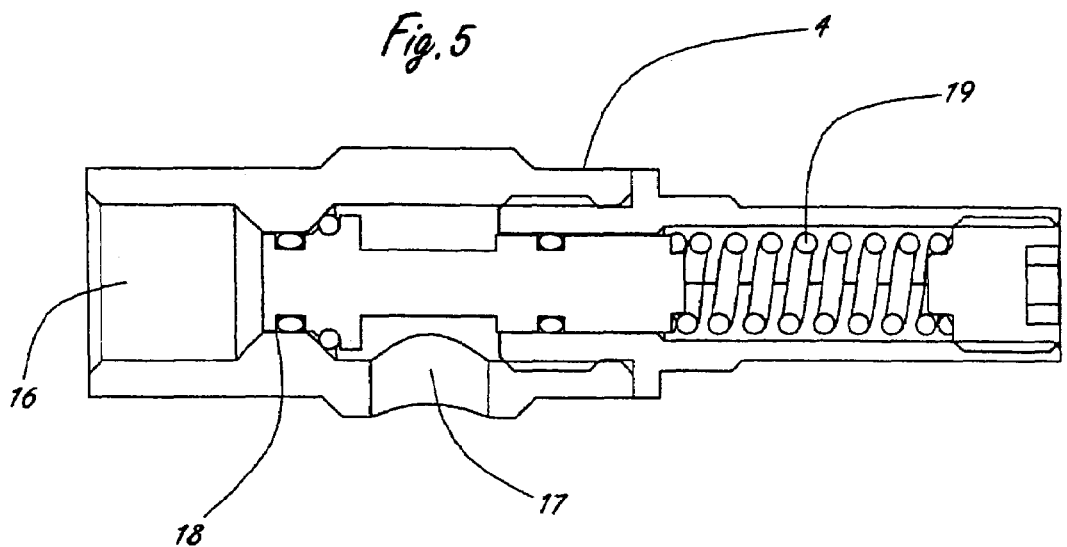
FIG. 5 shows a valve in the closed position.
Figure 6:
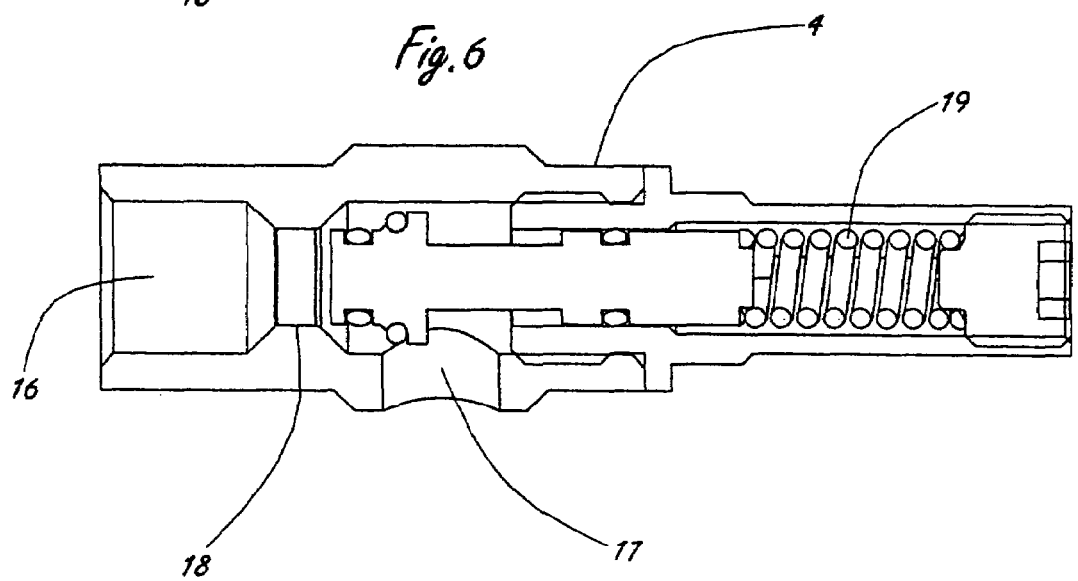
FIG. 6 shows the valve of FIG. 5 in the open position.

FIGS. 5 and 6 represent a valve 4 that may be used with the device according to the invention. The valve 4 comprises an inlet orifice 16 placed in relation with the water inlet pipe 3, an outlet orifice 17 placed in relation with the hydraulic means 6, 12, 13, the two orifices being connected via a closure zone 18 through which a stopper piston 25 may be housed. In the rest position, the stopper piston is confined in the closure zone 18 by means of a spring 19. So long as the force exerted by the spring 19 on the stopper piston is greater than the force exerted by the pressure existing in the water inlet pipe 3, the valve 4 remains closed. When the water pressure predominates, the valve 4 opens and the water comes out through the outlet orifice 17.

Advantageously, the force exerted by the spring may be adjusted by the user of the device. By varying the pressure of the water-coffee mixture existing in the capsule, the user therefore has the possibility of preparing his coffee to suit his tastes.

Figure 7:
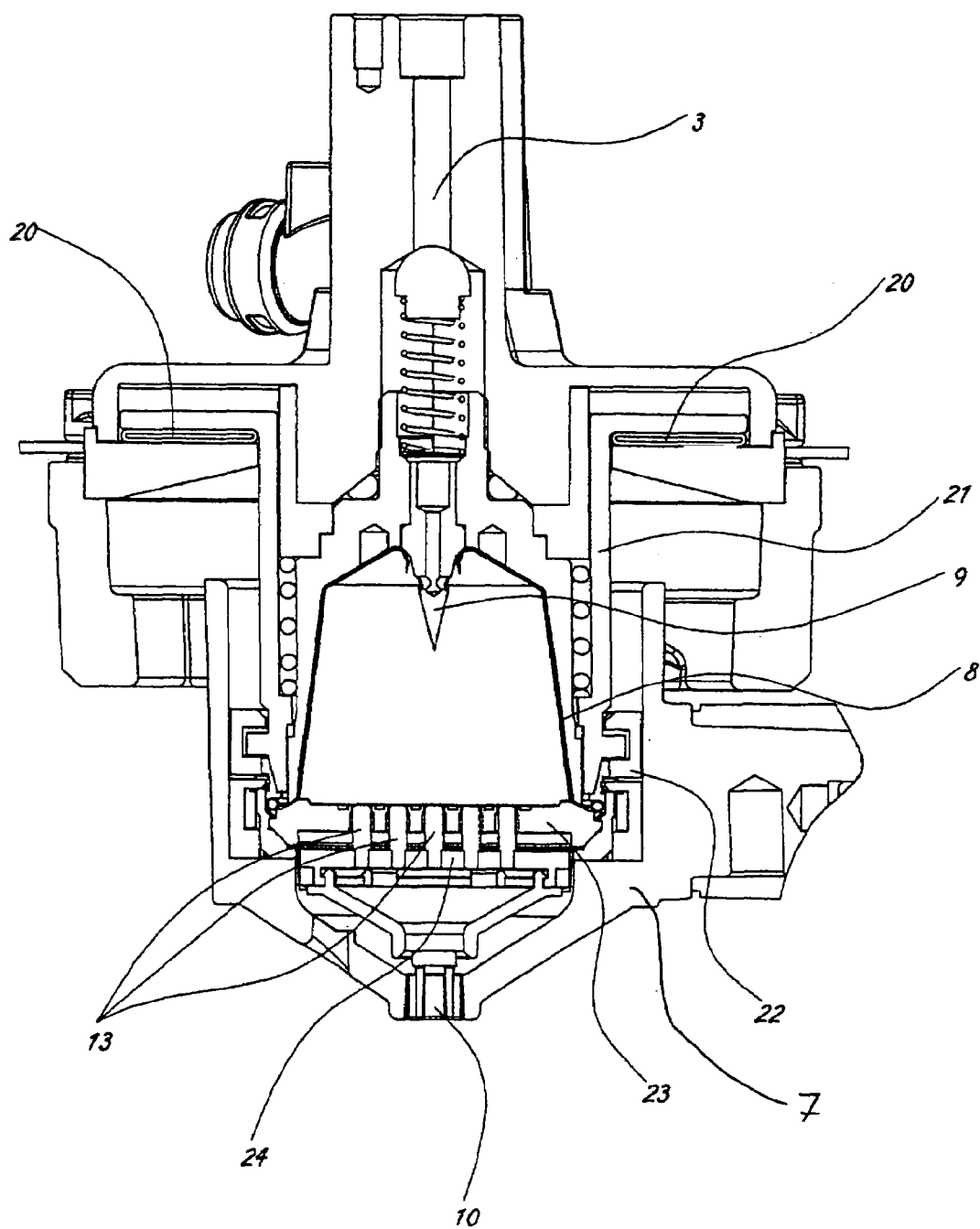
FIG. 7 shows a cross section of an embodiment of the device according to the invention in rest mode.
Figure 8:
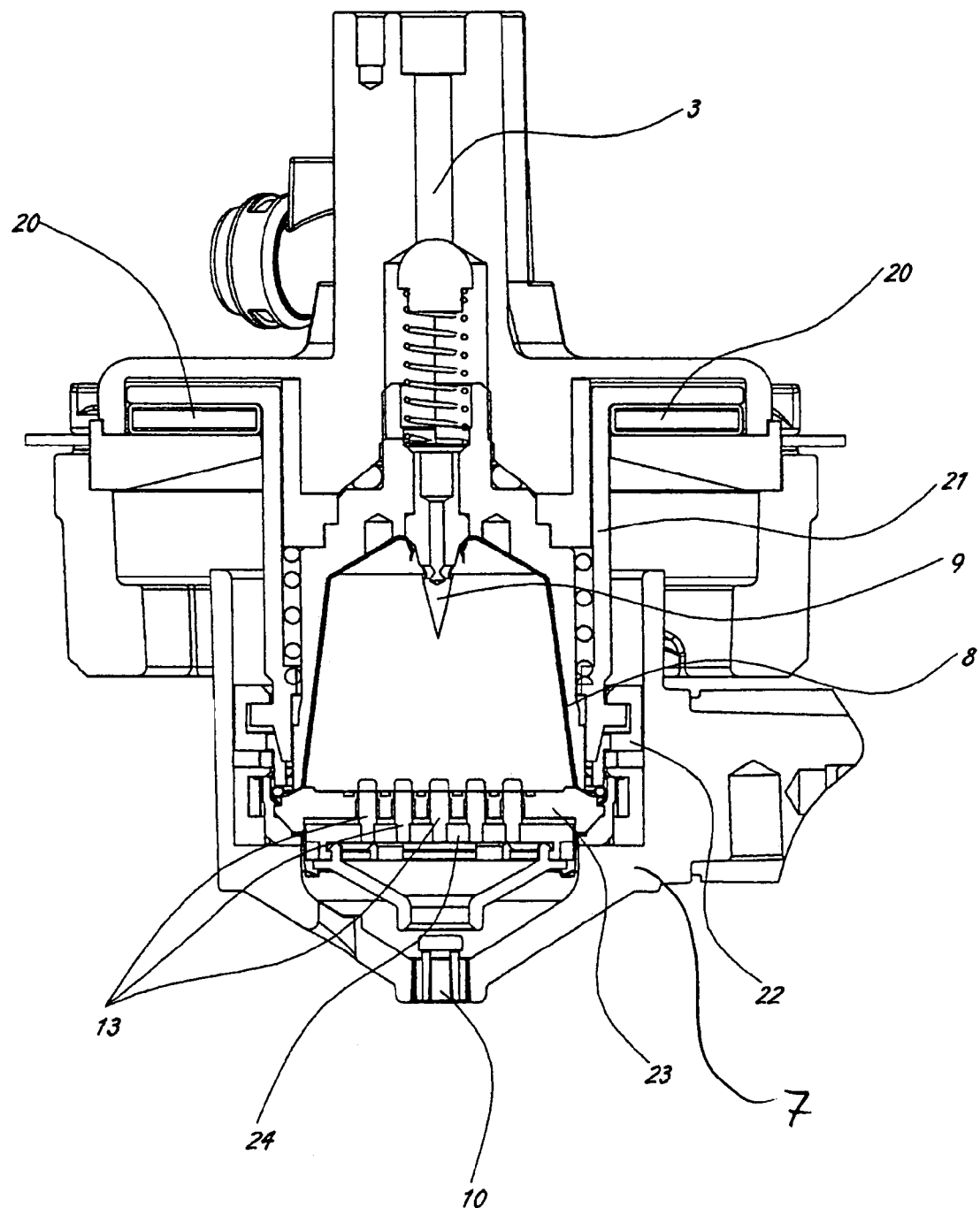
FIG. 8 shows a cross section of an embodiment of the device according to the invention in active mode.

A detailed embodiment of the variant of FIGS. 1 and 2 is represented in FIGS. 7 and 8. The same reference numbers are used.

The mechanism for actuating the perforating elements 13 comprises the following parts: a reservoir 20 made of flexible material, of annular shape, connected to the branch pipe 5 (not illustrated), a movable annular body 21 surrounding the capsule 8 and whose upper portion rests on the reservoir 20, a plate 24 for supporting perforating elements 13 that is connected to the annular body 21 via a fastening ring 22. The support 23 of the capsule-carrier 7 comprises a set of orifices through which the perforating elements may move.

The mechanism for actuating the perforating elements 13 operates as follows: in the rest position (FIG. 7), the perforating elements are placed beneath the lower wall of the capsule 8. In active mode (FIG. 8), the water enters the reservoir 20. The latter swells and operates upward the movable annular body 21 and the assembly that is fixedly attached thereto, that is the fastening ring 22, the support plate 24 and the perforating elements 13. The lower wall of the capsule is then perforated, which causes the water-coffee mixture to flow through the outlet orifice 10.

It goes without saying that the invention is not limited to the examples described hereinabove. For example, the Y-connector may also be situated between the heater body and the injection member. With this configuration, the use of a flexible reservoir as described hereinabove would be particularly advantageous. The latter could be easily replaced in the event of lime scale formation in the branch circuit.

The invention claimed is:

1. A device for preparing a coffee-based drink by extracting a dose of ground coffee contained in a capsule, said device comprising
   a water tank,
   a pump,
   a heater body, and
   a water injection member connected successively via a water inlet pipe;
   said device also comprising, disposed in an extension of the water injection member, a capsule-carrier and an outlet orifice for a water-coffee mixture, the capsule-carrier being suitable for being manually attached to and removed from the device and comprises means for containing a capsule of coffee, so that the pressurized water originating from the water injection member can pass through the capsule and pass through the outlet orifice,
   said device also comprising a single branch pipe, said branch pipe being connected at one of its ends to the water inlet pipe and comprises, at the other of its ends, hydraulic means suitable for controlling the outflow of a water-coffee mixture through the outlet orifice; and
   said device also comprising a valve placed on the branch pipe, said valve being suitable either to be open and allow the water to flow into the branch pipe when a preset pressure is reached, or closed and close off any flow in the branch pipe when said preset pressure is not yet reached.

2. The device as claimed in claim 1, comprising means of adjustment, by a user, of said preset pressure.

3. The device as claimed in claim 1, wherein the valve is pressure-sensitive.

4. The device as claimed in claim 1, wherein the hydraulic means comprise a stopper which alternatively closes off or releases the flow of a water-coffee mixture through the outlet orifice.

5. The device as claimed in claim 1, wherein the capsule-carrier comprises at least one outflow orifice and that the hydraulic means are placed so as to be able to close off said orifice.

6. The device as claimed in claim 1, wherein the hydraulic means comprise at least one perforation member which, when it is activated, perforates a capsule placed on the capsule-carrier and thereby allows a water-coffee mixture to flow through the outlet orifice.

7. The device as claimed in claim 1, wherein the hydraulic means comprise a flexible reservoir which, when it swells following the arrival of water, operates means which release the outflow of a water-coffee mixture through the outlet orifice.

\* \* \* \* \*